United States Patent [19]

Wysk et al.

[11] Patent Number: 4,895,757

[45] Date of Patent: Jan. 23, 1990

[54] PHOTOGRAPHIC PAPER SUPPORT MANUFACTURE

[75] Inventors: Wolfram Wysk, Belm; Bernd Scholz; Ralf-Burckhard Dethlefs, both of Osnabrück, all of Fed. Rep. of Germany

[73] Assignee: Felix Schoeller, Jr. GmbH & Co. K.G., Fed. Rep. of Germany

[21] Appl. No.: 72,406

[22] Filed: Jul. 13, 1987

[30] Foreign Application Priority Data

Jul. 22, 1986 [EP] European Pat. Off. ........... 86110061

[51] Int. Cl.[4] ........................ B32B 5/16; B32B 27/10; G03C 1/78

[52] U.S. Cl. ................................ 428/323; 428/476.9; 428/488.1; 428/513; 428/516; 428/537.1; 264/176.1; 430/536; 430/538

[58] Field of Search .................. 428/323, 476.9, 537.1, 428/513, 488.1, 516; 430/536, 538

[56] References Cited

U.S. PATENT DOCUMENTS 3,222,314 12/1965 Wolinski ............................ 260/33.2
3,778,404 12/1973 Nenkel et al. ...................... 260/33.2
4,675,245 6/1987 Von Meer ........................... 428/513
4,731,291 3/1988 Kerkhoff ............................ 428/573

*Primary Examiner*—P. C. Ives
*Attorney, Agent, or Firm*—Lockwood, Alex, FitzGibbon & Cummings

[57] ABSTRACT

A paper support material for photographic layers, as well as a process for the manufacture of such a support material, includes coating the paper on at least one side with a polyolefin layer containing a polyalkylene glycol, preferably a polyethylene glycol, a polypropylene glycol, or a copolymer of ethylene oxide and propylene oxide in a quantity between 40 ppm and 1% by weight, relative to the total quantity of the polyolefin. The molecular weight of the polyethylene glycol can be between 100 and 35,000, preferably 400 to 20,000, that of the polypropylene glycol can be between 400 and 10,000, preferably between 2,000 and 4,000, and that of the copolymers of ethylene oxide and propylene oxide can be between 200 and 20,000. In addition to the polyalkylene glycol, the polyolefin layer advantageously contains a fatty acid derivative from the group of soaps and fatty acid amides.

20 Claims, No Drawings

PHOTOGRAPHIC PAPER SUPPORT MANUFACTURE

The invention relates to resin coated paper support materials for photographic layers.

Resin coated photographic paper support materials generally consist of a base paper with synthetic resin coatings on both sides. The synthetic resin coatings on the base paper can consist of a polyolefin, such as polyethylene, and are generally applied to the paper by means of an extrusion coating process. They can, however, also be composed of organic varnish mixtures which are coated onto the paper by means of dipping or spraying processes, and are solidifed by means of ionizing radiation.

One or several light sensitive coatings based on silver halides are applied to one of the synthetic resin layers. The light sensitive layers can be black and white, as well as color photographic layers.

The synthetic resin coating (front side coating) positioned under the light sensitive layer or layers usually contains light remitting white pigment, as well as coloring pigments, optical brighteners and, if necessary, other additives such as antistatic agents, dispersing agents for the pigment, etc.

The synthetic resin film (reverse side coating) positioned on the paper side which is opposite the light-sensitive layers, can be pigmented or unpigmented and/or contain other additives, due to the specific use of the laminate as a photographic support. This layer can be coated with one or more further functional layers, e.g. layers for recordability, anti-static layer, sliding layer, adhesive layer, anti-curl layer or anti-halation layer.

The coating of a photographic base paper with polyolefin by extrusion through a T-die is a process which is already known. The polyolefin extrusion coating takes place at a point where the paper web enters the aperture between the chill roll and a rubber roll through which the polyolefin film is adhered to the paper web. The chill roll also serves for the formation of the surface structure of the polyolefin layer. Corresponding to the composition of the chill roll surface, e.g. glossy, dull or structured (for example, silk-like), polyolefin surfaces can be produced.

The production of high gloss surfaces has previously been associated with various defects. These generally involve high gloss surfaces of pigment containing polyolefin coatings which, after oxidizing pretreatment, either directly or by coating with a thin, adhesion-generating layer, support the photographic layers, and thus are decisive for the image appearance of the final photographic material.

Where the chill roll has a high gloss surface there are greater adhesive forces between the polyolefin surface and the chill roll surface, compared with dull and structured chill roll surfaces. This can result, even with a constant, uniform movement of the paper web, in a rhythmic detachment of the polyethylene film from the chill roll. In extreme cases, there even occurs a deposition of short-chained polyolefin components on the chill roll, which can lead to a serious impairment of the surface quality of the polyolefin film, since this stimulates a slight dulling.

The non-uniform, but rhythmic, separation of the polyolefin film causes an impairment of the desired uniform high gloss surface properties of the polyolefin film. Hair thin elevations arise laterally to the path of the paper web which are visible only in nearly parallel illumination, but which are not detectable by means of surface measurements, and which occur at a distance from one another of approximately 1 mm. These elevations remain discernible even after coating with the photographic emulsion and are perceived to be disruptive after exposure and subsequent development, especially in dark areas of the image.

In order to eliminate the occurrence of these defective markings, the coating speed previously had to be drastically decreased. Because of the presence of depositions, the glossy chill roll had to be cleaned more frequently.

A further measure for impeding the laterally-extending markings consists of adding a release additive to the polyolefin coating composition in order to reduce the adhesion of the polyolefin layer to the chill roll, and to attain a uniformly easy separation of the extruded film. Among these release additives are the metal salts of fatty acids, such as zinc or magnesium stearate, for example, which were named in Japanese patent application disclosures JP 32 442/1982, JP 46 818/1982, and JP 46 819/1982. It is furthermore known to use amides, such as oleamide and erucaic acid amide, as well as polyolefin wax and stearin, as release additives.

These release agents already described for use in the manufacture of photographic supports have, however, grave disadvantages.

One disadvantage is that these release agents must be used in the usual pigment containing polyolefin mixtures in relatively high concentrations (0.5%-2% by wt.), in order to attain the effect desired. With these high concentrations, the adhesion of the polyolefin to the chill roll is in fact reduced, but the adhesion of the polyolefin to the paper support is markedly weakened. Also disadvantages occur in the further processing of the photographic support, for example, in the form of loosening of the polyolefin layer from the paper during the stressing in the photographic process solutions, or even during the coating with the photographic layers. Moreover, these release agents, such as stearic acid, stearate, or stearic acid amide, strongly ooze out at extrusion temperatures from the molten polyolefin so that drop formation occurs, and subsequently visible, grease-like deposits appear on the polyolefin layer.

In U.S. Pat. No. 3,778,404 it is furthermore described that polyethylene glycols with a molecular weight of 400 to 4,000 can be suitable release agents in order to facilitate the separation of non-pigmented hot melt coating compositions based on polyethylene from the chill roll of an extrusion coating device. In this patent, 500 to 600 ppm polyethylene glycol with polyethylene of the density 0.924, and 900 to 1200 ppm polyethylene glycol with polyethylene of the density 0.915, are mentioned as additives.

Applying this knowledge of adding polyethylene glycol to pigmented polyolefin mixtures for photographic support papers was, however, not obvious for various reasons. Polyalkyleneoxides are known as substances which sensitize photographic silver salt layers. (See *Neblette's Handbook of Photography and Reprography,* 1977). Their use in the support material is essentially undesirable, because migration from there to the photographic layers cannot be controlled. On the other hand, it is known that polyalkyleneoxide deposits on the pigment surface and hydrophilizes these. This deposition not only leads to a firm bonding with the pigment surface, but also to a reinforcement of the moisture retention in the polyethylene/pigment mixture, and a reinforcement of the known "lacing" effect was to be feared during extrusion coating of mixtures with more than 10% by weight of the pigment. Finally, a further development of U.S. Pat. No. 3,778,404 demonstrated that the polyolefin adhesion to the base paper is noticeably impaired through the addition of, for example, 600 ppm polyethylene glycol 600 to the polyethylene.

It is therefore an objective of this invention to create a polyolefin coated support material with a high gloss surface of the pigment containing polyolefin coating, in which the pigment containing polyolefin layer separates easily and uniformly from the high gloss chill roll, yet still adheres well to the base paper, and has no effects which alter the sensitivity of the photographic layers.

This objective is solved by coating photographic base paper on the side which lies next to the photographic layers with a polyolefin mixture, which, in addition to polyolefin and white pigment, contains at least one polyoxyalkylene glycol. In one special form of execution, the pigmented polyolefin mixture contains, in addition to polyalkyleneoxide, a fatty acid soap of a polyvalent metal or a fatty acid amide.

For the coating of a photographic base paper, various polyolefins, such as polyethylene, polypropylene or an olefincopolymer, whether individually or in mixture, come into consideration. The preferred coating resin is, however, polyethylene, which can be used both as high density as well as low density types or a mixture of both types.

In photographic support materials, the preferred white pigment is a titanium dioxide or a mixture of titanium oxide with another white pigment or filler substance. Furthermore, small quantities of colored pigments, coloring substances, optical brighteners, or other known types of additives can be present in the coating.

The polyolefin coating mass can be applied on one or on both sides of the paper. The application takes place by the known extrusion coating process at temperatures between 270° and 330° C.

The paper support to be coated with a polyethylene mixture containing pigment in acordance with the invention can be any photographic base paper which is neutrally sized either by using an alkylketene dimer, or which has a known sizing on the basis of precipitated resin or fatty acid soaps. The base paper can be produced exclusively from cellulose fibers or from mixtures of cellulose fibers with synthetic fibers. It can have a substance weight of 60 to 300 $g/m^2$ (preferably 70 to 200 $g/m^2$), and may contain a surface sizing in addition to the mentioned internal sizing. In general a photographic base paper is understood to be an extremely white paper with uniform sheet formations which, by means of a particularly strong sizing, is protected against the penetration of the photographic processing solutions, and nonetheless displays no photochemical effects on the photographic layers.

Polyoxyalkylene glycol added to the polyolefin/pigment mixture involves a polyethylene glycol with a molecular weight between 100 and 35,000, preferably between 400 and 20,000, a polypropylene glycol with a molecular weight between 400 and 10,000, preferably between 2,000 and 4,000, or copolymers of ethylene oxide and propylene oxide having a molecular weight between 200 and 20,000. The polyoxyalkylene glycol used as a release agent can be added to the polyethylene mixture in any known manner. Preferred, however, is the introduction of the polyoxyalkylene glycol by means of a master batch.

The quantity of the polyoxyalkylene glycol used lies between 40 ppm and 1%, relative to the total quantity of the polyethylene, and preferably between 100 ppm and 0.5% by weight.

In the range of quantities cited, the occurrence of the laterally running markings is completely avoided, whereas the adhesion of the polyolefin film to the base paper is not disadvantageously influenced.

This result is, for several reasons, surprising.

First of all, the effect in accordance with the invention is already attained at the very low concentration of the release agent of 40 ppm polyoxyalkylene glycol, relative to the total quantity of the polyethylene/pigment mixture. The release agents previously described for use in photographic supports display their effects at substantially higher concentrations.

Secondly, the effect in accordance with the invention remains without visible exudations over a large range of concentrations. In the total range, that is even at concentrations of 0.5% to 1% by weight, in which the release agents usually employed are used, the polyethylene film easily separates from the chill roll by the use of polyalkylene glycols in accordance with the invention, and the adhesion of the polyethylene film to the paper support remains good to satisfactory, while the deficiencies already described arise with the release agents previously known.

Furthermore, with the use of the release agents in accordance with the invention, there neither occurs a contamination of the chill roll through the adhesion of short-chain polyolefin components, nor any observed formation of drops and the contamination connected therewith of the extruded polyolefin film through exuded release agents, nor are changes in sensitivity in the photographic layers observed.

With the use of polyoxyalkylene glycol in quantities less than 40 ppm (relative to the total quantity of the polyethylene mixture), the separation of the polyethylene film from the chill roll is, however, noticably worse, and the markings in the surface of the polyethylene coating described results.

With a polyoxyalkylene content of more than 1% by weight, relative to the polyethylene mixture, the separation of the polyethylene film from the chill roll occurs easily and uniformly, but an adequate adhesion to the paper support is no longer present.

In one special form of execution of the invention, the photographic base paper is coated with a polyolefin mixture which contains white pigment, which mixture, in addition to the polyoxyalkylene glycol, also contains a fatty acid salt of a polyvalent metal, such as Al-stearate, Mg-stearate, Zn-stearate, or the like, or a fatty acid amide. This combined use of polyglycol with a fatty acid derivative surprisingly displays a synergistic effect in polyolefin mixtures containing a pigment.

This was demonstrated by the fact that the separation from the chill roll with a combined use of polyglycol and fatty acid derivative occurred more easily and more cleanly than with the individual use of the components. Segregations on the roll were avoided, and the adhesion of the polyolefin layer to the base paper was surprisingly good.

The inventive concept is illustrated in greater detail through the following examples.

EXAMPLE 1

A photographic base paper having a basis weight of approximately 160 $g/m^2$, sized by using alkylketenedimer, was coated, by means of extrusion coating with a polyethylene mixture with the following composition:

| | |
|---|---|
| 50 weight % | low pressure polyethylene (density 0.963, melt flow index (MFI) 10); |
| 40 weight % | high pressure polyethylene (density 0.918, melt flow index (MFI) 7); and |
| 10 weight % | $TiO_2$ (rutile type). |

Polyethylene glycols with the following molecular weights were added in the form of a master batch to the mixture before the extrusion coating:

| | | | |
|---|---|---|---|
| 1a | MW | 100 | 200 ppm |
| 1b | MW | 600 | 200 ppm |
| 1c | MW | 6,000 | 200 ppm |
| 1d | MW | 35,000 | 200 ppm |
| 1e | MW | 100 | 0.1% by wt. |
| 1f | MW | 600 | 0.1% by wt. |
| 1g | MW | 6,000 | 0.1% by wt. |
| 1h | MW | 35,000 | 0.1% by wt. |
| 1i | MW | 600 | 0.5% by wt. |
| 1j | MW | 6,000 | 0.5% by wt. |
| 1k | MW | 10,000 | 1.0% by wt. |
| 1l | MW | 35,000 | 1.0% by wt. |

EXAMPLE 2:

A photographic base paper having a basis weight of approximately 160 $g/m^2$, sized by using alkylketenedimer, was coated by means of extrusion coating with a polyethylene mixture with the following composition.

| | |
|---|---|
| 50 weight % | low pressure polyethylene (density 0.963, MFI 10); |
| 40 weight % | high pressure polyetylene (density 0.918, MFI 7); and |
| 10 weight % | $TiO_2$ (rutile type). |

Polypropylene glycols with the following molecular weights were added to the mixture before extrusion coating in the form of a master batch:

| | | | |
|---|---|---|---|
| 2a | MW | 400 | 200 ppm |
| 2b | MW | 2,000 | 200 ppm |
| 2c | MW | 3,000 | 200 ppm |
| 2d | MW | 4,000 | 200 ppm |
| 2e | MW | 400 | 0.1% by wt. |
| 2f | MW | 2,000 | 0.1% by wt. |
| 2g | MW | 3,000 | 0.1% by wt. |
| 2h | MW | 4,000 | 0.1% by wt. |
| 2i | MW | 400 | 1.0% by wt. |
| 2j | MW | 2,000 | 1.0% by wt. |
| 2k | MW | 3,000 | 1.0% by wt. |
| 2l | MW | 4,000 | 1.0% by wt. |

EXAMPLE 3:

A photographic base paper having a basis weight of approximately 160 $g/m^2$, sized by using alkylketenedimer, was coated by means of extrusion coating with a polyethylene mixture with the following composition:

| | |
|---|---|
| 50 weight % | low pressure polyethylene (density 0.963 MFI 10); |
| 40 weight % | high pressure polyethylene (density 0.918 MFI 7); and |
| 10 weight % | $TiO_2$ (anatase type). |

Polyethylene glycols in the following quantities were added to the mixture before the extrusion coating in the form of a master batch:

| | | | |
|---|---|---|---|
| 3a | MW | 600 | 10 ppm |
| 3b | MW | 600 | 40 ppm |
| 3c | MW | 600 | 100 ppm |
| 3d | MW | 600 | 0.1% by wt. |
| 3e | MW | 600 | 0.5% by wt. |
| 3f | MW | 600 | 1.0% by wt. |
| 3g | MW | 6,000 | 10 ppm |
| 3h | MW | 6,000 | 40 ppm |
| 3i | MW | 6,000 | 100 ppm |
| 3k | MW | 6,000 | 0.1% by wt. |
| 3l | MW | 6,000 | 0.5% by wt. |
| 3m | MW | 6,000 | 1.0% by wt. |
| 3n | MW | 6,000 | 2.0% by wt. |

EXAMPLE 4:

A photographic base paper having a basis weight of approximately 160 $g/m^2$, sized by using alkylketenedimer, was coated by means of extrusion coating with a polyethylene mixture with the following composition:

| | |
|---|---|
| 50 weight % | low pressure polyethylene (density 0.963, MFI 10); |
| 40 weight % | high pressure polyethylene (density 0.918, MFI 7); and |
| 10 weight % | $TiO_2$ (anatase type). |

Polypropylene glycol in the following quantities was added to the mixture before the extrusion coating in the form of a master batch:

| | | | |
|---|---|---|---|
| 4a | MW | 2,000 | 10 ppm |
| 4b | MW | 2,000 | 40 ppm |
| 4c | MW | 2,000 | 100 ppm |
| 4d | MW | 2,000 | 0.1% by wt. |
| 4e | MW | 2,000 | 0.5% by wt. |
| 4f | MW | 2,000 | 1.0% by wt. |
| 4g | MW | 2,000 | 2.0% by wt. |

EXAMPLE 5:

A photographic base paper having a basis weight of approximately 160 $g/m^2$, acidically sized by using fatty acid soaps, was coated by means of extrusion coating, with a polyethylene mixture with the following composition:

| | |
|---|---|
| 25 weight % | low pressure polyethylene (density 0.963, MFI 10); and |
| 63 weight % | high pressure polyethylene (density 0.918, MFI 7) |

was mixed with the following additives:

TABLE 1

| A | B | C | D | E |
|---|---|---|---|---|
| 5a | 11 | 0.2 | 0.6 | 100 ppm (PEG,600) |
| 5b | 11 | 0.1 | 0.5 | 500 ppm (PEG,600) |
| 5c | 10 | 0.2 | 0.8 | 0.5% by wt. (PEG,600) |
| 5d | 11 | 0.2 | 0.6 | 100 ppm (PEG,6000) |
| 5e | 11 | 0.1 | 0.5 | 500 ppm (PEG,6000) |
| 5f | 10 | 0.2 | 0.8 | 1.0% by wt. (PEG,6000) |
| 5g | 11 | 0.2 | 0.6 | 100 ppm (PEG,2000) |
| 5h | 11 | 0.1 | 0.5 | 500 ppm (PEG,2000) |
| 5i | 10 | 0.2 | 0.8 | 0.5% by wt. (PEG,2000) |

Key
A = Example Number
B = Weight % of $TiO_2$ (rutile type R 101)
C = Weight % of ultramarine blue
D = Weight % of cobalt violet
E = Weight % of polyoxyalkylene glycol

EXAMPLE 6:

A photographic base paper having a basis weight of approximately 200 g/m$^2$, sized by using alkylketenedimer, with a surface sizing of starch and sodium sulfate, was coated by means of extrusion coating with a polyethylene mixture with the following composition:

| | |
|---|---|
| 20 weight % | low pressure polyethylene (density 0.963, MFI 10); |
| 70 weight % | high pressure polyethylene (density 0.918, MFI 7); |
| 9.8 weight % | $TiO_2$ (rutile type); |
| 0.1 weight % | optical brightener; |
| 0.1 weight % | stabilizer; and |
| 300 ppm | polyoxyalklylene glycol |
| 6a: | The polyoxyalkylene glycol is a polyethylene glycol (MW 600), and is added in the form of a master batch. |
| 6b: | The polyoxyalkylene glycol is a polyethylene glycol (MW 600), and is introduced to the extrusion melt by means of a dosing pump. |
| 6c: | The polyoxyalkylene glycol is a polypropylene glycol (MW 2000), and is added in the form of a master batch. |
| 6d: | The polyoxyalkylene glycol is a polypropylene glycol (MW 2000), and is introduced into the extrusion melt by means of a dosing pump. |

EXAMPLE 7:

A photographic base paper having a basis weight of approximately 160 g/m$^2$, sized by using alkylketenedimer, sodium stearate, aluminum salt and epoxied stearic acid amide, and surface sized with carboxylated polyvinyl alcohol, was coated by means of extrusion coating with a polyethylene mixture with the following composition:

| | |
|---|---|
| 30 weight % | low pressure polyethlene (density 0.963, MFI 9); |
| 57 weight % | high pressure polyetylene (density 0.915, MFI 7); |
| 12.9 weight % | titanium oxide (rutile type); |
| 0.03 weight % | ultramarine blue; |
| 0.01 weight % | phenolic antioxidant; and |
| 0.06 weight % | sterically hindered polymer amine (M = approximately 2500). |

The following combinations of release agents were added to the mixture before the extrusion, in the form of master batches with polyethylene:

| | | |
|---|---|---|
| 7a: | 200 ppm | polyethylene glycol 600 |
| | 0.4% by wt. | magnesium stearate |
| 7b | 100 ppm | polyethylene glycol 600 |
| | 0.4% by wt. | aluminum stearate |
| 7c | 200 ppm | polyethylene glycol 600 |
| | 0.1% by wt. | erucic acid amide |
| 7d | 200 ppm | polyethylene glycol 600 |
| | 0.3% by wt. | aluminum stearate |
| | 100 ppm | erucic acid amide |
| 7e | 400 ppm | polyethylene glycol 600 |
| | 0.2% by wt. | aluminum stearate |
| 7f | 400 ppm | polyethylene glycol 1000 |
| | 0.1% by wt. | magnesium stearate, |
| | 300 ppm | erucic acid amide |
| 7g | 300 ppm | polyethylene glycol 10,000 |
| | 0.2% by wt. | zinc stearate |
| | 300 ppm | erucic acid amide |
| 7h | 500 ppm | polyethylene glycol 10,000 |
| | 0.1% by wt. | aluminum stearate |
| | 500 ppm | behenic acid amide |

COMPARATIVE EXAMPLE 1V:

A photographic base paper having a basis weight of approximately 160 g/m$^2$, sized by using alkylketenedimer, was coated by means of extrusion coating with a polyethylene mixture with the following composition:

| | |
|---|---|
| 50 weight % | low pressure polyethylene (density 0.963, MFI 10); |
| 40 weight % | high pressure polyethylene (density 0.918, MFI 7); and |
| 10 weight % | $TiO_2$ (anatase type). |

Zinc stearate, magnesium stearate, aluminum stearate or erucic acid amide in the following quantities were added to the mixture before the extrusion, in the form of a master batch:

| | | |
|---|---|---|
| 1Va | 100 ppm | Zn-stearate |
| 1Vb | 0.1% by wt. | Zn-stearate |
| 1Vc | 0.5% by wt. | Zn-stearate |
| 1Vd | 1.0% by wt. | Zn-stearate |
| 1Ve | 2.0% by wt. | Zn-stearate |
| 1Vf | 100 ppm | Mg-stearate |
| 1Vg | 0.1% by wt. | Mg-stearate |
| 1Vh | 0.5% by wt. | Mg-stearate |
| 1Vi | 1.0% by wt. | Mg-stearate |
| 1Vk | 2.0% by wt. | Mg-stearate |
| 1Vl | 40 ppm | Al-stearate |
| 1Vm | 100 ppm | Al-stearate |
| 1Vn | 0.1% by wt. | Al-stearate |
| 1Vo | 0.5% by wt. | Al-stearate |
| 1Vp | 1.0% by wt. | Al-stearate |
| 1Vq | 40 ppm | Erucic acid amide |
| 1Vr | 100 ppm | Erucic acid amide |
| 1Vs | 0.1% by wt. | Erucic acid amide |
| 1Vt | 0.5% by wt. | Erucic acid amide |
| 1Vu | 1.0% by wt. | Erucic acid amide |

COMPARATIVE EXAMPLE 2V:

A photographic base paper having a basis weight of approximately 100 g/m$^2$, acidically sized by using fatty acid soaps, was coated with polyethylene mixtures with the following compositions:

| | |
|---|---|
| 25 weight % | low pressure polyethylene (density 0.963, MFI 10); |
| 63 weight % | high pressure polyethylene (density 0.918, MFI 7); |

-continued

| | |
|---|---|
| 10 weight % | $TiO_2$ (rutile type); |
| 0.60 weight % | cobalt blue; |
| 0.78 weight % | cobalt violet; |
| 0.05 weight % | optical brightener; |
| 0.01 weight % | phenolic antioxidant; and |
| 0.06 weight % | sterically hindered amine (M = approximately 2500); |

as well as:

| | | |
|---|---|---|
| 2Va | 0.5 weight % | zinc stearate |
| 2Vb | 0.5 weight % | magnesium stearate |
| 2Vc | 0.5 weight % | erucic acid amide |

EXAMINATION OF THE SUPPORT MATERIALS:

Three criteria were cited for the examination of the support materials:

1. The separation of the polyethylene film from the chill roll.

The separation was evaluated visually, and was described by three grades:

(a) Easy separation ("easy");

(b) Satisfactory separation ("average"); or (c) Bad separation ("bad").

2. The appearance of defective markings on the coating surfaces at coating speeds of 100 and 150 m/min.

These markings are described as:

(a) Severe ("++");

(b) Sporadic ("+"); or (c) Not at all ("0").

3. The adhesion of the polyethylene film to the paper support, at a coating speed of 100 m/min.

To determine adhesion, the polyethylene film is removed from the base paper at an angle of 180°.

If the polyethylene film can be removed without damage of the fiber felt of the paper, the adhesion was graded "5". According to the extent of damage to the fiber felt, adhesion grades of "4" (adequate adhesion), "3" (satisfactory adhesion), or "2" (good adhesion) were noted.

Examination results:

Example 1:

| A | B | C-1 | C-2 | D |
|---|---|---|---|---|
| 1a | Average | 0 | + | 2 |
| 1b | Average | 0 | + | 2 |
| 1c | Average | 0 | + | 2 |
| 1d | Average | 0 | + | 2 |
| 1e | Average | 0 | 0 | 2 |
| 1f | Average | 0 | 0 | 2–3 |
| 1g | Average | 0 | 0 | 2 |
| 1h | Average | 0 | 0 | 2 |
| 1i | Easy | 0 | 0 | 3 |
| 1j | Easy | 0 | 0 | 2–3 |
| 1k | Easy | 0 | 0 | 2 |
| 1l | Easy | 0 | 0 | 2 |

Example 2:

| A | B | C-1 | C-2 | D |
|---|---|---|---|---|
| 2a | Average | 0 | + | 2 |
| 2b | Average | 0 | + | 2 |
| 2c | Average | 0 | + | 2 |
| 2d | Average | 0 | + | 2 |
| 2e | Average | 0 | 0 | 3 |
| 2f | Average | 0 | 0 | 3 |
| 2g | Average | 0 | 0 | 2 |
| 2h | Average | 0 | 0 | 2 |
| 2i | Easy | 0 | 0 | 3 |
| 2j | Easy | 0 | 0 | 3 |
| 2k | Easy | 0 | 0 | 3 |

-continued

| A | B | C-1 | C-2 | D |
|---|---|---|---|---|
| 2l | Easy | 0 | 0 | 2–3 |

Example 3:

| A | B | C-1 | C-2 | D |
|---|---|---|---|---|
| 3a | Bad | ++ | ++ | 2 |
| 3b | Bad/Average | + | ++ | 2 |
| 3c | Average | 0 | + | 2 |
| 3d | Average | 0 | 0 | 2 |
| 3e | Easy | 0 | 0 | 3 |
| 3f | Easy | 0 | 0 | 3–4 |
| 3g | Bad | ++ | ++ | 2 |
| 3h | Average | + | + | 2 |
| 3i | Average | 0 | + | 2 |
| 3k | Average | 0 | 0 | |
| 3 | 2 | | | |
| 3l | Easy | 0 | 0 | 2 |
| 3m | Easy | 0 | 0 | 2 |
| 3 | Easy | 0 | 0 | 3 |

Example 4:

| A | B | C-1 | C-2 | D |
|---|---|---|---|---|
| 4a | Bad | ++ | ++ | 2 |
| 4b | Average | + | + | 2 |
| 4c | Average | 0 | + | 2 |
| 4d | Easy | 0 | 0 | 2 |
| 4e | Easy | 0 | 0 | 2 |
| 4f | Easy | 0 | 0 | 3 |
| 4g | Easy | 0 | 0 | 4 |

Example 5:

| A | B | C-1 | C-2 | D |
|---|---|---|---|---|
| 5a | Average | 0 | + | 2 |
| 5b | Average | 0 | 0 | 2–3 |
| 5c | Easy | 0 | 0 | 3 |
| 5d | Average | 0 | 0 | 2 |
| 5e | Average | 0 | 0 | 2 |
| 5f | Easy | 0 | 0 | 2 |
| 5g | Average | 0 | + | 2 |
| 5h | Average | 0 | 0 | 2 |
| 5i | Easy | 0 | 0 | 2 |

Example 6:

| A | B | C-1 | C-2 | D |
|---|---|---|---|---|
| 6a | Average | 0 | 0 | 2 |
| 6b | Average | 0 | + | 2 |
| 6c | Average | 0 | 0 | 2 |
| 6d | Average | 0 | 0 | 2 |

Example 7:

| A | B | C-1 | C-2 | D |
|---|---|---|---|---|
| 7a | Easy | 0 | 0 | 2–3 |
| 7b | Easy | 0 | 0 | 2–3 |
| 7c | Easy | 0 | 0 | 2 |
| 7d | Easy | 0 | 0 | 2 |
| 7e | Easy | 0 | 0 | 2 |
| 7f | Easy | 0 | 0 | 2 |
| 7g | Easy | 0 | 0 | 2–3 |
| 7h | Easy | 0 | 0 | 2 |

Comparative Example 1V:

| A | B | C | D |
|---|---|---|---|
| 1Va | Bad | ++ | 3–4 |
| 1Vb | Bad | ++ | 3–4 |
| 1Vc | Average | + | 3–4 |
| 1Vd | Easy | 0 | 4–5 |
| 1Ve | Easy | 0 | 4–5 |
| 1Vf | Bad | ++ | 3–4 |
| 1Vg | Bad | ++ | 3–4 |
| 1Vh | Average | + | 3–4 |
| 1Vi | Easy | 0 | 4–5 |
| 1Vk | Easy | 0 | 4–5 |
| 1Vl | Bad | ++ | 3 |
| 1Vm | Bad | ++ | 3 |
| 1Vn | Bad | ++ | 3–4 |
| 1Vo | Average | + | 3–4 |
| 1Vp | Easy | 0 | 4–5 |
| 1Vq | Bad | ++ | 3 |
| 1Vr | Bad | ++ | 3 |
| 1Vs | Average | + | 3–4 |
| 1Vt | Easy | 0 | 4–5 |

-continued

| | | | |
|---|---|---|---|
| 1Vu | Easy | 0 | 5 |
| | Comparative Example 2V: | | |
| A | B | C | D |
| 2Va | Easy | 0 | 4-5 |
| 2Vb | Easy | 0 | 4-5 |
| 2Vc | Easy | 0 | 5 |

Key
A = Number
B = Separation from the chill roll
C = Appearance of the markings at 100 m/min
C-1 = Appearance of markings - at 100 m/min
C-2 = Appearance of markings - at 150 m/min
D = Adhesion of the film to the paper

We claim:

1. A photographic support material comprising a photographic base paper coated with at least one layer of a polyolefin pigmented mixture containing white pigment and having a surface receptive to the application of a light sensitive photographic coating thereon positioned on at least one side of the paper, said polyolefin layer mixture also containing a polyalkylene glycol therein in a quantity of between about 40 ppm and 15 by weight relative to the total quantity of the polyolefin.

2. The photographic support material of claim 1, wherein the polyalkylene glycol is polyethylene glycol.

3. The photographic support material of claim 1, wherein the polyalkylene glycol is polypropylene glycol.

4. The photographic support material of claim 2, wherein the polyethylene glycol has a molecular weight of about 100 to 35,000.

5. The photographic support material of claim 4, wherein the polyethylene glycol has a molecular weight of about 400 to 20,000.

6. The photographic support material of claim 3, wherein the polypropylene glycol has a molecular weight of about 400 to 10,000.

7. The photographic support material of claim 6, wherein the polypropylene glycol has a molecular weight of about 2,000 to 4,000.

8. The photographic support material of claim 1, wherein the polyalkylene glycol is present in a quantity of about 100 ppm to 0.5% by weight relative to the total quantity of the polyolefin.

9. The photographic support material of claim 1, wherein said polyolefin layer also includes at least one fatty acid derivative from the group consisting of soaps and fatty acid amides.

10. The photographic support material of claim 9, wherein said fatty acid derivative is a soap of a polyvalent metal.

11. The photographic support material of claim 9, wherein said fatty acid derivative is derived from a $C_{14}$-$C_{24}$ fatty acid.

12. The photographic support material of claim 9, wherein said polyolefin layer contains a fatty acid soap and a fatty acid amide.

13. The photographic support material of claim 1, wherein the side opposite said one side of the paper is also coated with polyolefin.

14. The photographic support material of claim 9, wherein the side opposite said one side of the paper is also coated with polyolefin.

15. The photographic support material of claim 12, wherein the side opposite said one side of the paper is also coated with polyolefin.

16. The photographic support material of claim 1, wherein the front side of said material is prepared by physical or chemical preliminary treatment for the adhesion of a photographic layer.

17. The photographic support material of claim 9, wherein the front side of said material is prepared by physical or chemical preliminary treatment for the adhesion of a photographic layer.

18. The photographic support material of claim 12, wherein the front side of said material is prepared by physical or chemical preliminary treatment for the adhesion of a photographic layer.

19. The photographic support material of claim 1, wherein the polyalkylene glycol is a copolymer of ethylene oxide and propylene oxide.

20. The photographic support material of claim 19, wherein said copolymer has a molecular weight of about 200 to 20,000.

* * * * *

UNITED STATES PATENT AND TRADEMARK OFFICE

CERTIFICATE OF CORRECTION

PATENT NO. : 4,895,757

DATED : January 23, 1990

INVENTOR(S) : Wolfram Wysk, Bernd Scholz & Ralf-Burckhard Dethlefs

It is certified that error appears in the above-identified patent and that said Letters Patent is hereby corrected as shown below:

In column 3, line 43, delete "acordance" and insert -- accordance --.

In column 5, line 44, delete "polyetylene" and insert -- polyethylene --.

In column 5, last line, delete the period "." and insert a comma -- , --.

In column 7, line 57, delete "polyethlene" and insert -- polyethylene --.

In column 7, line 59, delete "polyetylene" and insert -- polyethylene --.

In column 8, in batch 7f, after "stearate" delete the comma ",".

In column 10, Example 3k, in the last column marked "D", add -- 2 --.

In column 10, in the line following Example 3k, delete the "3" and the "2".

In column 10, line 17, in the column marked "A", delete the "3" and insert -- 3n --.

In column 11, claim 1, penultimate line, delete "15" and insert -- 1% --.

Signed and Sealed this

Seventh Day of May, 1991

*Attest:*

HARRY F. MANBECK, JR.

*Attesting Officer* *Commissioner of Patents and Trademarks*